(12) United States Patent
Moore et al.

(10) Patent No.: US 12,321,591 B2
(45) Date of Patent: Jun. 3, 2025

(54) STORAGE DATA COPIES WITH DIFFERING COMPRESSION ALGORITHMS

(71) Applicant: International Business Machines Corporation, Armonk, NY (US)

(72) Inventors: Roderick Guy Charles Moore, Bournemouth (GB); Ben Sasson, North Baddesley (GB); Lee Jason Sanders, Chichester (GB); Paul Nicholas Cashman, Alton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/192,886

(22) Filed: Mar. 30, 2023

(65) Prior Publication Data
US 2024/0256123 A1    Aug. 1, 2024

(30) Foreign Application Priority Data

Feb. 1, 2023   (GB) ...................... 2301423

(51) Int. Cl.
*G06F 3/06* (2006.01)
(52) U.S. Cl.
CPC ............ *G06F 3/0604* (2013.01); *G06F 3/064* (2013.01); *G06F 3/0689* (2013.01)
(58) Field of Classification Search
CPC ...... G06F 3/0604; G06F 3/064; G06F 3/0689; G06F 3/0611; G06F 3/0665; G06F 3/0608; G06F 3/065; G06F 3/0683; G06F 2206/1012
USPC ....................................................... 711/111
See application file for complete search history.

(56) References Cited

U.S. PATENT DOCUMENTS

| 10,732,884 B1 | 8/2020 | Gupta |
| 10,929,040 B1 | 2/2021 | Trachtman |
| 2011/0185222 A1* | 7/2011 | Min .................... G06F 11/2074 714/E11.091 |
| 2019/0107954 A1 | 4/2019 | Rueger |

(Continued)

FOREIGN PATENT DOCUMENTS

| EP | 3707610 A1 | 7/2022 |
| JP | H08-123627 A | 5/1996 |

OTHER PUBLICATIONS

International Search Report and Written Opinion dated Apr. 9, 2024 from International Application No. PCT/EP2024/051313 filed Jan. 19, 2024.

(Continued)

*Primary Examiner* — Hua J Song
(74) *Attorney, Agent, or Firm* — Heather Johnston

(57) ABSTRACT

A system for managing a storage array in a storage system may include an analysis component for analyzing a set of compression ratios used for a set of storage blocks written on a first storage device and a second storage device to determine a pattern. The system may include a determination component for determining, responsive to the pattern, a first compression ratio and a second compression ratio; the first compression ratio may be different from the second compression ratio. The system may include a data read/write component for writing a storage block to the first storage device with the first compression ratio and writing the storage block to the second storage device with the second compression ratio.

20 Claims, 8 Drawing Sheets

(56) References Cited

U.S. PATENT DOCUMENTS

| | | |
|---|---|---|
| 2019/0339911 A1 | 11/2019 | Bassov |
| 2020/0004631 A1 | 1/2020 | Jaquette |
| 2020/0034059 A1 | 1/2020 | Yin et al. |
| 2020/0192758 A1 | 6/2020 | Pletka |
| 2020/0249869 A1 | 8/2020 | Glimcher |
| 2021/0263682 A1* | 8/2021 | Jeon .................. G06F 3/0679 |
| 2022/0382717 A1* | 12/2022 | Zhang ................ G06F 16/1744 |
| 2022/0414061 A1 | 12/2022 | Memon |

OTHER PUBLICATIONS

Moore et al., "Storage Data Copies With Differing Compression Algorithms", United Kingdom Patent Application No. 2301423.6, Filed Feb. 1, 2023, 24 pages.

Intellectual Property Office, "Patents Act 1977: Search Report under Section 17(5)," Jul. 20, 2023, 3 Pages, GB Application No. 2301423.6.

* cited by examiner

700

702 TABLE_1 For DISK_1

| Time | Volume | Compression |
|---|---|---|
|  |  |  |
| $T_N$ | VOL_N | C1 |
| $T_{N-1}$ | VOL_N-1 | C2 |
| $T_{N-2}$ | VOL_N-2 | C1 |
| $T_{N-3}$ | VOL_N-3 | C2 |
| ...... |  | .... |
| $T_1$ | VOL_1 | C1 |

705

712 TABLE_2 For DISK_1    720

| Time | Volume | Compression | C |
|---|---|---|---|
|  |  |  |  |
| $T_N$ | VOL_N | C2 | 4 |
| $T_{N-1}$ | VOL_N-1 | C2 | 3 |
| $T_{N-2}$ | VOL_N-2 | C2 | 2 |
| $T_{N-3}$ | VOL_N-3 | C2 | 1 |
| ...... |  | .... |  |
| $T_1$ | VOL_1 | C1 |  |

STORAGE DATA COPIES WITH DIFFERING COMPRESSION ALGORITHMS

BACKGROUND

The present disclosure relates to storage. In particular, the present disclosure provides a method, system, and computer program product for managing a storage array in a storage system.

Many computer systems use a redundant array of independent disks (RAID) for data storage purposes. This allows for desirable data transfer rates over a single disk access. It also provides error correction, data protection, and disk redundancy. Disks are also known as "disk drives" or simply "drives."

RAID systems are disk array storage systems used to provide large storage areas, fast access times and rates, and redundancy for data protection. For example, data can be mirrored across two or more disks so that if one disk fails the data is available from the remaining disks. Alternatively, data can be spread over multiple disks allowing concurrent reading of data. Data parity can also be provided in a further disk such that if one disk fails then data can be recovered from the remaining disks. RAID systems are controlled by a RAID controller. A RAID controller is a hardware unit that configures a RAID array and provides a RAID layer so that, to the computer system using the disk array, the disk array appears as a logical, single disk.

Most modern storage controllers will use a RAID algorithm to spread data across multiple disks to add redundancy to prevent data loss upon disk failure.

Advanced copy services are also available. Advanced copy services may copy data from one disk to another for a variety of purposes such as, for example, data backup.

Some modern disks, such as high-performance flash drives that provide high throughput and input/output operations per second (IOPS) with consistent and predictable latency, may implement internal, hardware-based compression algorithms. A disk may support more than one algorithm simultaneously, selecting the algorithm for a certain write based on internal logic. Different compression algorithms may have different characteristics of compressibility and speed of compression; the higher the compression ratio, the longer the disk will take to compress data. Different compression algorithms may be used for different copies of the same data; upon reading certain data, an appropriate copy may be used by matching specified performance characteristics. However, this technique may lead to unbalanced systems in terms of performance.

SUMMARY

Embodiments of the present disclosure include a system, method, and computer program product for managing a storage system.

A system for managing a storage array in a storage system may include an analysis component for analyzing a set of compression ratios used for a set of storage blocks written on a first storage device and a second storage device to determine a pattern. The system may include a determination component for determining, responsive to the pattern, a first compression ratio and a second compression ratio; the first compression ratio may be different from the second compression ratio. The system may include a data read/write component for writing a storage block to the first storage device with the first compression ratio and writing the storage block to the second storage device with the second compression ratio.

A system for managing a storage array in a storage system is provided. The storage array may include a first data block and a second data block. The system may include an analysis component for analyzing a set of compression ratios used for a set of storage blocks written on the first storage device and the second storage device to determine a pattern. The system may further include a determination component for determining a first compression ratio and a second compression ratio responsive to the pattern; the first compression ratio may be different from the second compression ratio. The system may also include a data read/write component for writing a storage block to the first storage device with the first compression ratio and writing the storage block to the second storage device with the second compression ratio.

In some embodiments of the present disclosure, analyzing the set of compression ratios may include determining a first spare capacity on the first storage device and second spare capacity on the second storage device. In some embodiments, determining that the first spare capacity is greater than the second spare capacity by a threshold value may result in the first compression ratio being less than the second compression ratio. In some embodiments, determining that the first spare capacity is less than the second spare capacity by a threshold value may result in the first compression ratio being greater than the second compression ratio.

In some embodiments of the present disclosure, analyzing the set of compression ratios may include determining that a third compression ratio has been used for the most recent Y writes to the first storage device and determining that a fourth compression ratio has been used for the most recent Y writes to the second storage device. In some embodiments, determining the first compression ratio may include determining that the first compression ratio equals the fourth compression ratio. In some embodiments, determining the second compression ratio may include determining the second compression ratio equals the third compression ratio.

In some embodiments of the present disclosure, the first storage device and the second storage device may be members of a RAID array. In some embodiments, the RAID array may be a member of a list; in some embodiments, the list may include RAID 1, RAID 10, RAID 51, and RAID 61.

In some embodiments of the present disclosure, the second storage device may be a copy of the first storage device. In some embodiments, the second storage device may be a point-in-time copy of the first storage device.

A computer-implemented method for managing a storage system is provided. The storage system may include a first storage device and a second storage device. The method may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

A system for managing a storage array in a storage system is provided. The storage array may include a first data block and a second data block. The system may include a memory, a processor in communication with the memory, and program instructions executable by one or more processors via the memory. The program instructions may be to perform one or more methods of the present disclosure. A method in accordance with the present disclosure may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

A computer program product for managing a storage system is provided. The computer program product may include a computer readable storage medium readable by a processing circuit and storing instructions for execution by the processing circuit for performing a method. The computer program product may execute the instructions to perform a method as disclosed herein. Such a method may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

A computer program may be stored on a computer readable medium such that it is loadable into the internal memory of a digital computer. The computer program may include software code portions. The computer program may be run on a computer to perform one or more methods of the present disclosure. A method in accordance with the present disclosure may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 illustrates a diagram of tables which may be used to determine a pattern of compression ratios in accordance with some embodiments of the present disclosure.

Figure 1:
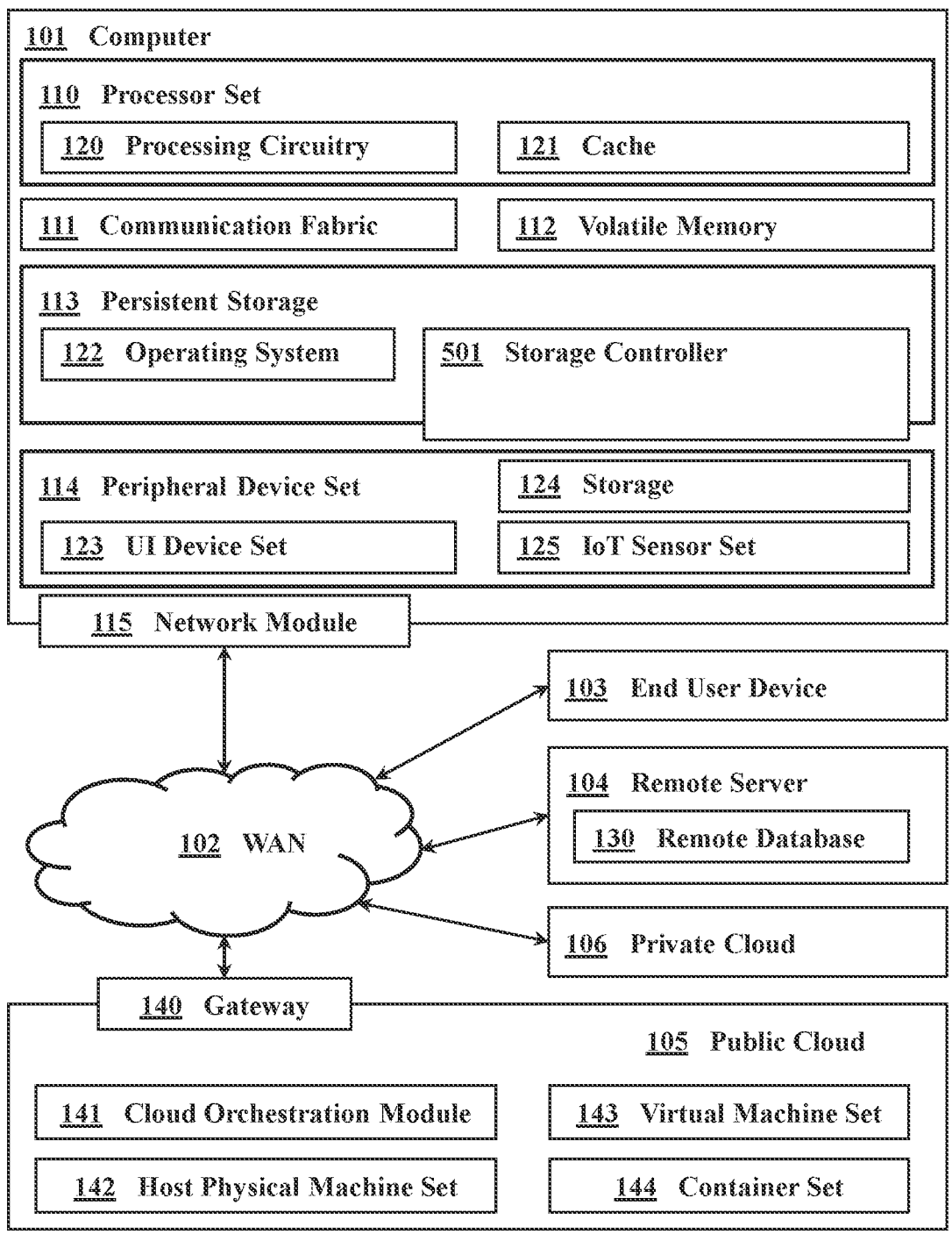
FIG. 1 illustrates a computing environment in accordance with some embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure to storage. In particular it provides a method, system, and computer program product suitable for managing a storage array in a storage system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product ("CCP") embodiment in the present disclosure describes any set of one or more storage media (or "mediums") collectively included in a set of one or more storage devices that collectively include machine readable code corresponding to instructions and/or data for performing computer operations specified in a given CPP claim. A storage device may be any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, some other non-transitory storage medium, or any suitable combination of the foregoing. Some known types of storage devices using these mediums include: diskette, hard disk, random access memory (RAM), read-only memory (ROM), erasable programmable read-only memory (EPROM or flash memory), static random access memory (SRAM), compact disc read-only memory (CD-ROM), digital versatile disk (DVD), memory stick, floppy disk, mechanically encoded device (such as punch cards or a series of pits-and-lands formed in a major surface of a disc), and combinations of the foregoing. A computer readable storage medium, as used herein, is not to be construed as storage in the form of transitory signals per se such as radio waves, other freely propagating electromagnetic waves, electromagnetic waves propagating through a waveguide, light pulses passing through a fiber optic cable, electrical signals communicated through a wire, and/or other transmission media. As will be understood by persons having ordinary skill in the art, data is typically moved at some occasional points in time during normal operations of a storage device, such as during access, de-fragmentation, or garbage collection; this does not render the storage device transitory because the data is not transitory while it is stored.

A system for managing a storage array in a storage system is provided. The storage array may include a first data block and a second data block. The system may include an analysis component for analyzing a set of compression ratios used for a set of storage blocks written on the first storage device and the second storage device to determine a pattern. The system may further include a determination component for determining a first compression ratio and a second compression ratio responsive to the pattern; the first compression ratio may be different from the second compression ratio. The system may also include a data read/write component for writing a storage block to the first storage device with the first compression ratio and writing the storage block to the second storage device with the second compression ratio.

In some embodiments of the present disclosure, analyzing the set of compression ratios may include determining a first spare capacity on the first storage device and second spare capacity on the second storage device. In some embodiments, determining that the first spare capacity is greater than the second spare capacity by a threshold value may result in the first compression ratio being less than the second compression ratio. In some embodiments, determining that the first spare capacity is less than the second spare capacity by a threshold value may result in the first compression ratio being greater than the second compression ratio.

In some embodiments of the present disclosure, analyzing the set of compression ratios may include determining that a third compression ratio has been used for the most recent Y writes to the first storage device and determining that a fourth compression ratio has been used for the most recent Y writes to the second storage device. In some embodiments, determining the first compression ratio may include determining that the first compression ratio equals the fourth compression ratio. In some embodiments, determining the second compression ratio may include determining the second compression ratio equals the third compression ratio.

In some embodiments of the present disclosure, the first storage device and the second storage device may be members of a RAID array. In some embodiments, the RAID array may be a member of a list; in some embodiments, the list may include RAID 1, RAID 10, RAID 51, and RAID 61.

In some embodiments of the present disclosure, the second storage device may be a copy of the first storage device. In some embodiments, the second storage device may be a point-in-time copy of the first storage device.

A computer-implemented method for managing a storage system is provided. The storage system may include a first storage device and a second storage device. The method may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

A system for managing a storage array in a storage system is provided. The storage array may include a first data block and a second data block. The system may include a memory, a processor in communication with the memory, and program instructions executable by one or more processors via the memory. The program instructions may be to perform one or more methods of the present disclosure. A method in accordance with the present disclosure may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

A computer program product for managing a storage system is provided. The computer program product may include a computer readable storage medium readable by a processing circuit and storing instructions for execution by the processing circuit for performing a method. The computer program product may execute the instructions to perform a method as disclosed herein. Such a method may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

A computer program may be stored on a computer readable medium such that it is loadable into the internal memory of a digital computer. The computer program may include software code portions. The computer program may be run on a computer to perform one or more methods of the present disclosure. A method in accordance with the present disclosure may include analyzing a set of compression ratios used for a set of storage blocks written on the first storage device and the second storage device to determine a pattern. The method may further include determining a first compression ratio and a second compression ratio in response to the pattern; the first compression ratio may be different from the second compression ratio. The method may also include writing a storage block to the first storage device with the first compression ratio and writing the storage block to the second storage device with the second compression ratio.

Some embodiments of the present disclosure may provide a method, system, computer program product and/or computer program. Such an embodiment may include analyzing a set of compression ratios and determining a first spare capacity on the first storage device and second spare capacity on the second storage device. Such an embodiment may further include determining a first compression ratio and a second compression ratio. Determining a first compression ratio and a second compression ratio may include determining the first compression ratio and the second compression ratio in response to determining that the first spare capacity is greater than the second spare capacity by a threshold value; the first compression ratio may be less than the second compression ratio. Determining a first compression ratio and a second compression ratio may include determining the first compression ratio and the second compression ratio in response to determining that the first spare capacity is less than the second spare capacity by the threshold value; the first compression ratio may be greater than the second compression ratio.

Having a disk that supports two different compression algorithms such that one is faster but less space-efficient and the second is slower but more compact enables a copying algorithm in a storage controller to choose to write one copy to fast-but-low compression storage and the second to slow-but-high compression storage. If this choice of low compression and high compression is distributed across the disks such that the total used storage is consistent across all disks, then the total storage used may be less than conventional copying; as a result, there may be a reduced total cost of storage. In some situations, it may be advantageous to use such an algorithm so that higher compression may be used to save space while the impact of the slower performance may be minimized. Writes may complete when the faster, low-compressed writes have completed. The impact of a slower decompression on reads may be minimized or eliminated as reads may be directed to the mirror with the least compressed version of the data.

FIG. 1 illustrates a computing environment 100 in accordance with some embodiments of the present disclosure. The computing environment 100 is an example environment for the implementation of one or more embodiments of the disclosure. The computing environment 100 includes a computer 101, a wide area network (WAN) 102, an end user device (EUD) 103, a remote server 104, a public cloud 105, and a private cloud 106.

In the computing environment 100, the computer 101 includes a processor set 110 with processing circuitry 120 and a cache 121, a communication fabric 111, and a volatile memory 112. The computer 101 also includes persistent storage 113 with an operating system 122 and a storage controller 501. The computer 101 also includes a peripheral device set 114 with a user interface (UI) device set 123, storage 124, and an Internet of Things (IoT) sensor set 125. The computer 101 also includes a network module 115.

The remote server 104 includes a remote database 130. The public cloud 105 includes a gateway 140, a cloud orchestration module 141, a host physical machine set 142, a virtual machine set 143, and a container set 144.

The computer 101 may be a desktop computer, laptop computer, tablet computer, smart phone, smart watch, other wearable computer, mainframe computer, quantum computer, or any other form of computer or mobile device now known or to be developed in the future that is capable of running a program and querying a database or accessing a network. For example, the computer 101 may query the remote database 130 via the WAN 102 and the remote server 104; in some embodiments, the computer 101 may query a database via local area network (LAN) or via direct connection to the database. Depending upon the technology utilized, performance of a computer-implemented method may be distributed among multiple computers and/or between multiple locations; thus, the computer 101 may be located partially or wholly in one or more physical facilities, a private cloud, a public cloud, or some combination thereof.

The processor set 110 may include one or more computer processors of any type now known or to be developed in the future. The processing circuitry 120 may be distributed over multiple packages such as, for example, multiple coordinated integrated circuit chips. The processing circuitry 120 may implement multiple processor threads and/or multiple processor cores. The cache 121 is memory that is located in the processor chip package(s); the cache 121 may be used for data or code that should be available for rapid access by the threads or cores running on the processor set 110. Cache memories may be organized into multiple levels depending upon relative proximity to the processing circuitry. In some embodiments, some or all of the cache for the processor set may be located off chip. In some embodiments, the processor set 110 may be designed for working with qubits and performing quantum computing.

Computer readable program instructions may be loaded onto computer 101 to cause operations to be performed by the processor set 110 of the computer 101 and thereby effect a computer-implemented method as disclosed herein. In such an embodiment, the instructions thus executed may initiate and/or perform the methods specified in the flowcharts and/or narrative descriptions of computer-implemented methods of the present disclosure. These computer-readable program instructions may be stored in one or more types of computer readable storage media, such as the cache 121 of FIG. 1, physical storage, digital storage, quantum storage, blockchain storage, and/or other storage media. The program instructions and associated data may be accessed by the processor set 110 to control and/or direct performance of a disclosed method. In the computing environment 100, the instructions for performing the herein-disclosed methods may be stored, wholly or partially, in persistent storage 113.

The communication fabric 111 is a signal conduction path that enables various components of the computer 101 to communicate with each other. The communication fabric 111 may be made of switches and electrically conductive paths, such as the switches and electrically conductive paths that make up busses, bridges, physical input/output (I/O) ports, and the like. Other types of signal communication paths may be used such as fiber optic communication paths and/or wireless communication paths.

The volatile memory 112 may be any type of volatile memory now known or to be developed in the future. Examples include dynamic-type random access memory (DRAM) or static-type random access memory (SRAM). The volatile memory 112 may be random access or other type of memory; the volatile memory 112 is not required to be random access unless expressly indicated. In the computer 101, the volatile memory 112 is located in a single package and is internal to computer 101; alternatively or additionally, a volatile memory may be distributed over multiple packages and/or located externally with respect to the computer 101.

The persistent storage 113 may be any form of non-volatile storage for computers that is now known or to be developed in the future. The stored data is maintained regardless of whether power is being supplied to the computer 101 and/or directly to persistent storage 113 because of the non-volatility of the persistent storage 113. The persistent storage 113 may be a read-only memory (ROM); in some embodiments, at least a portion of the persistent storage allows writing, deletion, and re-writing of data. The persistent storage 113 may include, for example, magnetic disks and solid-state storage devices. The operating system 122 may take several forms such as currently used or hereinafter developed proprietary or open-source Portable Operating System Interface (POSIX)-type operating systems; in some embodiments, the operating system 122 may employ a kernel. In some embodiments, code included in the persistent storage 112 may include some or all of the computer code for performing the methods of the present disclosure.

The peripheral device set 114 may include a set of peripheral devices of the computer 101. Communication connections between peripheral devices and other components of the computer 101 may be implemented in various ways currently known in the art or hereinafter developed such as connections via Near-Field Communication (NFC), cables such as universal serial bus (USB) type cables, insertion such as secure digital (SD) card, local area communication networks or LANs, wide area networks such as the internet, and the like.

The peripheral device set 114 may include a UI device set 123. In some embodiments, the UI device set 123 may include components such as one or more display screens, touchscreens, touchpads, speakers, microphones, wearable devices (such as goggles and smart watches), keyboards, mouses, printers, game controllers, haptic devices, and/or the like.

The peripheral device set 114 may include storage 124. The storage 124 may be external storage such as an external hard disk or insertable storage such as an SD card. The storage 124 may be persistent and/or volatile. In some embodiments, the storage 124 may take the form of a quantum computing storage device for storing data in the form of qubits. In some embodiments, the computer 101 may be required to have a large amount of storage (for example, where the computer 101 locally stores and manages a large database); in such an embodiment, the storage 124 may be provided by peripheral storage devices designed for storing very large amounts of data such as a storage area network (SAN) that is shared by multiple computers which may be geographically distributed.

The peripheral device set 114 may include an IoT sensor 125. The IoT sensor set 125 may include one or more sensors that may be used in IoT applications. For example, in some embodiments, one sensor may be a thermometer and another sensor may be a motion detector; alternatively or additionally, other sensors may be used.

The network module 115 may be computer software, hardware, and/or firmware that allows the computer 101 to communicate with other computers through the WAN 102. The network module 115 may include hardware such as modems or Wi-Fi signal transceivers, software for packetizing and/or de-packetizing data for communication network transmission, and/or web browser software for communicating data over the internet. In some embodiments, network control functions and network forwarding functions of the network module 115 may be performed on the same physical hardware device. In some embodiments, the control functions and the forwarding functions of network module 115 may be performed on physically separate devices such that the control functions manage several different network hardware devices; such an embodiment may utilize software-defined networking (SDN). Computer-readable program instructions as disclosed herein may be downloaded to the computer 101 from an external computer or external storage device through a network adapter card or network interface which may be included in the network module 115.

The WAN 102 may be any WAN (for example, the internet) capable of communicating computer data over non-local distances by any technology for communicating computer data currently known or hereinafter developed. In some embodiments, the WAN 102 may be replaced and/or supplemented by one or more LANs designed to communicate data between devices located in a local area such as a Wi-Fi network. The WAN 102 and/or LANs may include computer hardware such as copper transmission cables, optical transmission fibers, wireless transmission, routers, firewalls, switches, gateway computers, edge servers, and the like.

The EUD 103 may be any computer system that is used and controlled by an end user; a user may be, for example, a customer of an enterprise that operates the computer 101. The EUD 103 may take a form discussed above in connection with the computer 101. The EUD 103 may receive data from the operations of the computer 101. For example, if the computer 101 is designed to provide a recommendation to an end user, the recommendation may be communicated from the network module 115 of the computer 101 through the WAN 102 to the EUD 103. In this way, the EUD 103 may display or otherwise present the recommendation to an end user. In some embodiments, the EUD 103 may be a client device; the EUD 103 may thus be a thin client, a heavy client, a mainframe computer, a desktop computer, or the like.

The remote server 104 may be any computer system that serves at least some data and/or functionality to the computer 101. The remote server 104 may be controlled and/or used by the same entity as the one operating the computer 101. The remote server 104 may represent machine(s) that collect and store data for use by other computers (e.g., computer 101). For example, if the computer 101 is designed and programmed to provide a recommendation based on historical data, then the historical data necessary for generating that recommendation may be provided to the computer 101 from the remote database 130 of the remote server 104.

The public cloud 105 may be any computer system available for use by multiple entities that provides on-demand availability of computer system resources and/or other computer capabilities. The public cloud 105 may provide, for example, data storage (e.g., cloud storage) and/or computing power without direct active management by the user. Cloud computing may leverage the sharing of resources to achieve coherence and economies of scale.

The direct and active management of the computing resources of the public cloud 105 may be performed by the computer hardware and/or software of the cloud orchestration module 141. The computing resources provided by the public cloud 105 may be implemented via one or more virtual computing environments that run on various computers making up the computers of the host physical machine set 142; the host physical machine set 142 may be referred to as the universe of physical computers in and/or available to public cloud 105.

Virtual computing environments (VCEs) may take the form of virtual machines from the virtual machine set 143 and/or containers from the container set 144. In some embodiments, VCEs may be stored as images and may be transferred among and between the various physical machine hosts either as images or after instantiation of the VCE. The cloud orchestration module 141 may manage the transfer of images, storage of images, deployment of new instantiations of VCEs, and instantiation of active VCE deployments. The gateway 140 is the collection of computer software, hardware, and firmware that allows the public cloud 105 to communicate through the WAN 102.

VCEs may be stored as images. A new active instance of the VCE can be instantiated from the image. Two examples of VCEs are virtual machines and containers. A container is a VCE that uses operating-system-level virtualization. An operating system feature may include a kernel that allows the existence of multiple isolated user-space instances; each isolated user-space instance may be called a container. Each container may behave as a real computer from the point of view of any programs running in them. A computer program running on an ordinary operating system may utilize all resources of that particular computer such as connected devices, files, folders, network shares, CPU power, and quantifiable hardware capabilities. Similarly, programs running inside a container can only use the contents of the container and devices assigned to the container; this feature is known as containerization.

The private cloud 106 may be similar to the public cloud 105 except that the computing resources are only available for use by a single enterprise (e.g., one company, school, organization, individual, or grouping thereof). While the private cloud 106 is depicted as being in communication with the WAN 102, in other embodiments a private cloud may be disconnected from the internet entirely and only accessible through a local and/or private network.

A hybrid cloud is a composition of multiple clouds of different types (e.g., private, community, and/or public cloud types) often respectively implemented by different vendors. Each of the multiple clouds remains a separate and discrete entity; however, the larger hybrid cloud architecture is bound together by standardized or proprietary technology that enables orchestration, management, and/or data/application portability between the multiple constituent clouds. In such an embodiment, the public cloud 105 and the private cloud 106 may each individually or both be part of one or more larger hybrid clouds.

A logical unit number (LUN) is a unique identifier for identifying a collection of physical or logical storage. A LUN may refer to a single disk, a partition of disks, or an entire redundant array of independent disks (RAID) array. Logical block addressing (LBA) is a method for specifying a location of blocks of data on storage devices.

A small computer system interface (SCSI) may include a set of command set standards for physically connecting and transferring data between one or more computers and peripheral devices such as disks. There may be other command sets. SCSI is available in a number of interfaces, for example, SSA, 1 Gbit Fiber Channel (1 GFC), and/or SAS. SCSI may be parallel or serial.

A SAS protocol may be used for internal disks. Storage subsystems may have controllers that provide the required hardware adapters for host connectivity to the subsystem. RAID adapters may be used to generate a virtual disk or a LUN that may be configured in one of the supported RAID levels with multiple SAS hard disks based on the level of RAID used. Various levels of RAID may be available to configure internal SAS HDDs or SDDs.

A RAID may have a number of different architectures depending on the required balance between fault tolerance and performance. An architecture may be referred to as a level. In RAID level 0, data blocks are striped across a disk array without any faut tolerance. In RAID level 1, data is mirrored across two disks.

In RAID level 5, data blocks are striped across the disks and on one disk a parity checksum of all the block data is written. The parity data are not written to a fixed disk; instead, they are spread across all disks. If a disk fails, data can be recovered using the remaining block data and the block. In RAID level 6, data blocks and also dual parities are striped across the disks. RAID 6 is designed to handle dual disk failures.

Other RAID levels may be used. In RAID level 2, data bits are striped across a set of data disks and error correction codes are written to redundancy disks. In RAID level 3, data bytes are striped across a set of data disks and parity values are written to parity disks. In RAID level 4, data blocks are striped across a set of data disks and parity values are written to parity disks.

Additionally, nested combinations of RAID may be used. Nested RAID levels are usually numbered with at least two digits such that the first digit designates the lower RAID level and the second digit designates a level above. For example, RAID 10 is a combination of RAID 1 and RAID 0 with the striping of RAID 1 above the mirroring of RAID 1. Other examples include RAID 15 which is a combination of RAID 5 above RAID 1, RAID 51 which is a combination of RAID 1 above RAID 5, and RAID 61 which is a combination of RAID 1 above RAID 6.

On each physical disk, data may be stored in predefined blocks of approximately the same size. A predefined number of blocks of data and appropriate parity information may be mapped to define a stripe of data, which is distributed across the elements of the RAID array. A strip size may generally be $8k$ to 64 k bytes. A stripe is a group of corresponding stripe units.

Common RAID levels may include:
RAID 0: Data is striped across one or more disks; there is no redundancy
RAID 1: Data is mirrored between two disks
RAID 5: Data is striped across a minimum of three disks with one rotating parity
RAID 6: Data is striped across a minimum of five disks with two rotating parities
RAID 10: Data is striped across pairs of mirrored disks; there is a minimum of two disks RAID arrays may be configured using a hardware adapter; this may be referred to as "hardware RAID." RAID arrays may also be configured using operating system software; this may be referred to as "software RAID."

In storage systems, data may be lost if a disk that the data is stored on fails. With fault tolerant RAID levels (e.g., RAID 1, RAID 5 and RAID 6), such data can be recovered from a remaining disk and re-written to a repaired disk or to a spare disk. The array is thus "rebuilt."

A RAID controller, which may be referred to as a disk array controller, is a device that manages the physical disks and presents them to the computer as logical units. The RAID controller may have a front-end interface to a computer system's host adapter; an example of such an interface is SCSI. The RAID controller may also have a back-end interface for communicating with underlying disks. RAID controllers may carry out numerous other functions in addition to RAID management and I/O functionality; for example, a RAID controller may provide functions for controller failover and array copy services.

Another architecture that may use an array of multiple disks is just a bunch of disks (JBOD). JBOD may be made available to an overlying system as a set of independent disks or as a spanned single volume without RAID technology.

In a storage system, many levels of abstraction may be used. A storage disk may manage physical placement of data blocks onto the disk media, and in-built functionality may handle data block placement. For example, a drive may identify media errors and can therefore relocate blocks to appropriate media positions whilst still presenting a logical contiguous block space to an upstream storage controller.

A RAID 5 array may include a stride length of 5 blocks; the stride may have four data blocks and one parity block. The writing of a file may include caching data in the RAID controller; the RAID controller may calculate a parity value for four data blocks of the file at a time. A first stripe P of five blocks may be written to a drive array: a first data block of P to drive N, a second data block of P to drive N+1, a third data block of P to drive N+2, a fourth data block of P to drive N+3, and parity value of P to drive N+3. In a rotating system, a subsequent stripe of blocks P+1 may be written to a drive array starting this time with a first data block of P+1 to drive N+1, second first data block of P+1 to drive N+1, a third data block of P+1 to drive N+2, a fourth data block of P+1 to drive N+3, with the parity value of P+1 written to drive N. Data and parity may be rotated around the five-drive array. In some embodiments, one advantage of rotating writes may be to even out drive writes.

If a drive fails in a RAID 5 array, a data block of a stride may be rebuilt using the stride blocks on drives that are not failing. For example, if drive N were to fail in the above example, the second, third, and fourth data blocks of stripe P may be XOR'd with the parity bit of drive N+3 to recover the data block N of stripe P.

Some embodiments of the present disclosure may combine the use of different compression strategies on storage devices that contain copies of data. An example of a storage device is a storage disk, such as a high-performance flash drive that provides high throughput and input/output operations per second (IOPS) with consistent and predictable latency. Embodiments described herein may be described in terms of block storage technology; other technologies such as file storage technology may be equally applicable.

Compression may be implemented without impacting an existing environment and may be used with other storage processes such as mirrored volumes and copy services functions. Compressed volumes may provide an equivalent level of availability as regular volumes. When reading a compressed block from a disk, data may be uncompressed. Compressed read block performance may vary between disk types; however, some disk types may provide similar compressed block read performance between different compression algorithms. For example, read performance of LZ compression may be higher for higher compression ratios because the CPU needs to process less compressed data than with lower compression ratios. Some disk types may have a fixed compression algorithm whereas other disk types may have a variable compression algorithm. In some embodiments, disk types may use some combination of fixed combination algorithm and variable compression algorithm.

An example that generates a copy is mirroring RAID technology. The standard RAID 1 algorithm protects from disk failure by mirroring data to a second disk. The present disclosure is described primarily using RAID 1 embodiments; the present disclosure may also apply to other RAID mirroring technologies including, but not limited to, RAID 10, RAID 51, and RAID 61.

When a server writes to a mirrored volume, the system writes the data to both copies of the volume. When a server reads a mirrored volume, the system picks one of the copies to read. If one of the mirrored volume copies is temporarily unavailable, the volume remains accessible to servers; a mirrored volume copy may become unavailable if, for example, the storage system that provides the pool is unavailable. The system remembers which areas of the volume are written and resynchronizes these areas when both copies are available.

When volumes are generated, compression may be used to save capacity for the volume. With compressed volumes, data is compressed as it is written to disk; compressing data may save space on the disk. When data is read to a host (e.g., host 605 of FIG. 6), the data is decompressed.

In some embodiments of the present disclosure, storage drives may have compression ratios C1 and C2 such that C1 is less than C2. A storage device may support multiple values of compression ratio.

Figure 2:
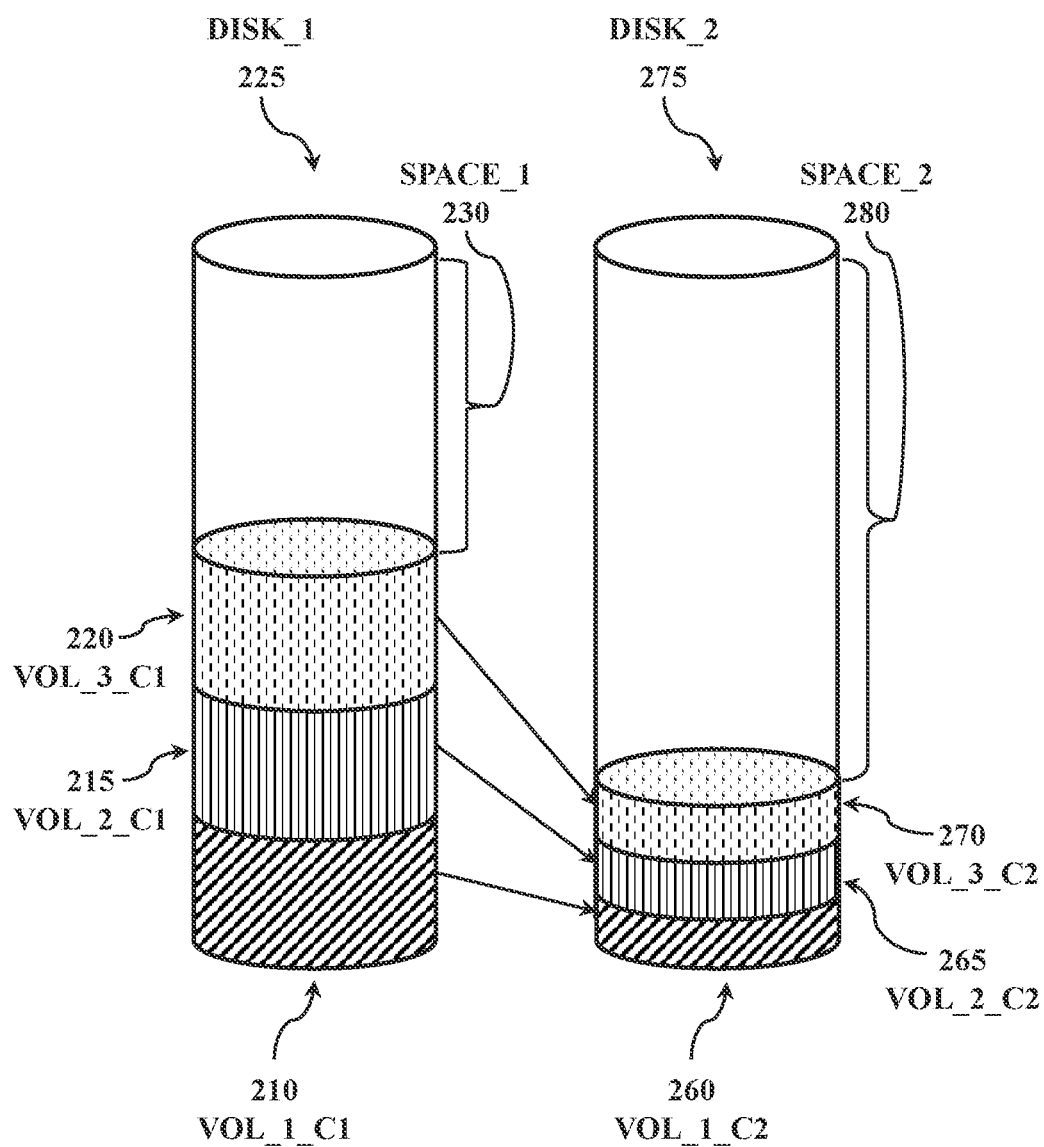
FIG. 2 depicts a schematic diagram of storage drives in accordance with some embodiments of the present disclosure.

FIG. 2 depicts a schematic diagram 200 of storage drives in accordance with some embodiments of the present disclosure. In FIG. 2, the storage blocks are written on drives contiguously from the bottom of the drives. It is to be understood that different write patterns may be used, storage blocks may be removed, other storage blocks may be added, and the like.

The schematic diagram 200 includes a data mirror written to two drives, DISK_1 225 and DISK_2 275. As used herein, the term "storage block" refers to a block of data to be written to or read from a disk. The size of a storage block is set by the host (e.g., host 605 of FIG. 6), but common sizes are 4 kB, 8 kB, 16 kB, 32 kB, 64 kB, 128 kB, and 256 kB. In some embodiments, sizes 32 kB-256 kB may be typical.

The schematic diagram 200 shows three storage blocks written to the mirrored disks DISK_1 225 and DISK_2 275; the three storage blocks are VOL_1, VOL_2, and VOL_3. The storage blocks are written to DISK_1 225 with compression ratio C1, and the storage blocks are written to DISK_2 275 with compression ratio C2; as illustrated, compression ratio C1 is less than compression ratio C2. This compression results in DISK_1 225 containing compressed volumes VOL_1_C1 210, VOL_2_C1 215, and VOL_3_C1 220. The remaining available space on DISK_1 225 is SPACE_1 230. Similarly, as a result of the compression, DISK_2 275 contains compressed volumes VOL_1_C2 260, VOL_2_C2 265, and VOL_3_C2 270. The remaining available space on DISK_2 275 is SPACE_2 280.

The higher compression storage blocks on DISK_2 275 consume less space than the lower compression storage blocks on DISK_1 225 because the storage blocks on DISK_2 275 are stored using the higher compression ratio C2 and the storage blocks on DISK_1 225 are stored using the lower compression ratio C1. If all writes are directed to the disks with this pattern, then eventually the lower compression disk would be full and the higher compression disk would still have available space.

Figure 3:
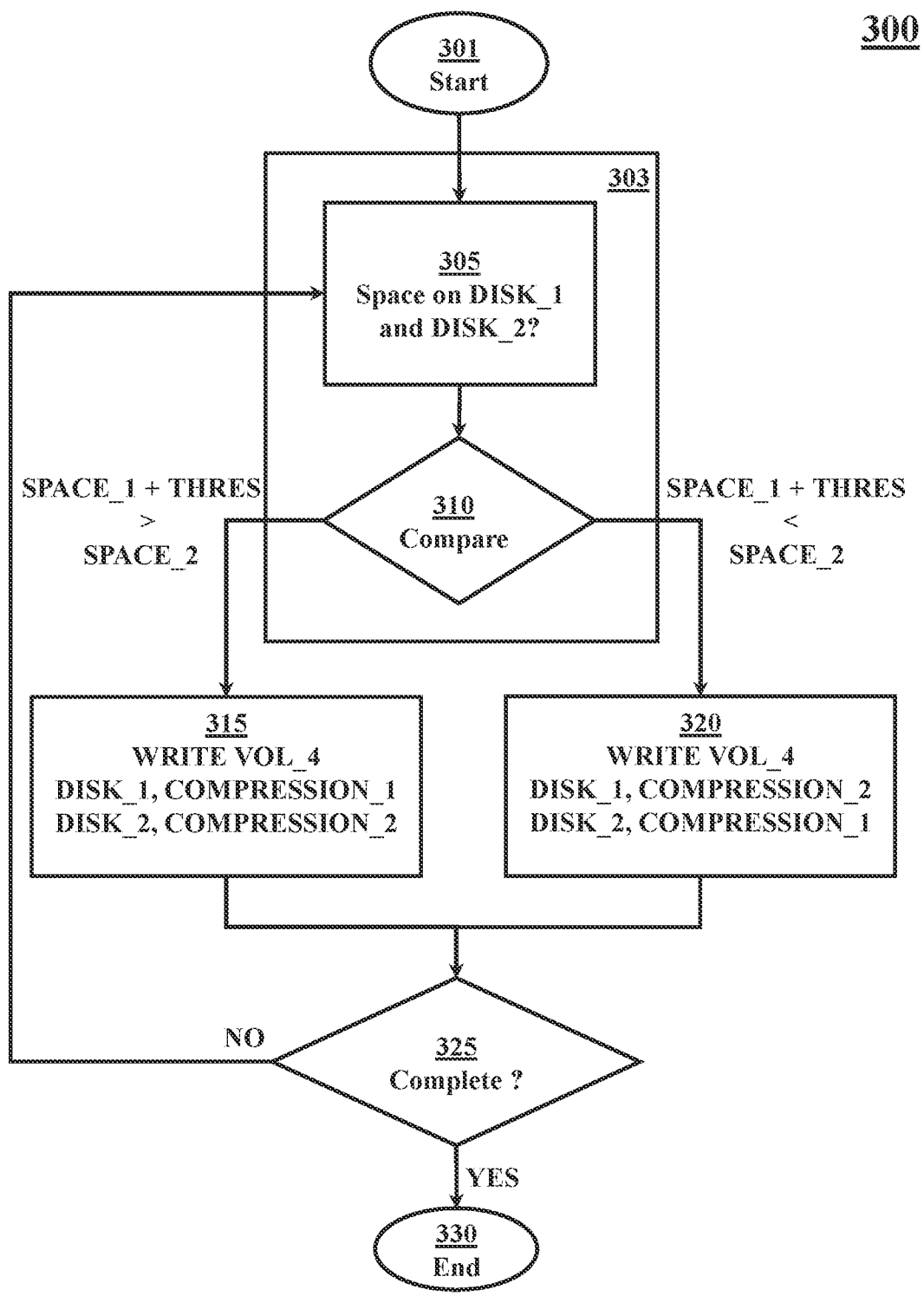
FIG. 3 illustrates a schematic flow diagram for a method for writing a storage block in a storage array in accordance with some embodiments of the present disclosure.

FIG. 3 illustrates a schematic flow diagram 300 for a method for writing a storage block in a storage array in accordance with some embodiments of the present disclosure.

The method may commence at the start 301. The method may continue by analyzing 303 a set of compression ratios used for a set of storage blocks written on the first storage device and the second storage device to determine a pattern. Analyzing 303 a set of compression ratios may include determining 305, via a space component, a spare capacity on a first disk (e.g., SPACE_1 130 on DISK_1 125) and a spare capacity on a second disk (e.g., SPACE_2 180 on DISK_2 175). Analyzing 303 a set of compression ratios may include comparing 310, via a compare component, the spare capacity on a first disk to the spare capacity on a second disk.

The compare component may determine whether a spare capacity on a first disk is greater than a spare capacity on a second disk by a threshold value THRES. By using threshold value THRES, the algorithm may allow for a tolerance to be set when determining appropriate compression ratios, including whether to switch compression ratios. Alternatively, the compare component may determine that the spare capacity on the first disk is not greater than the spare capacity on the second disk by a threshold value THRES; the algorithm may allow for a tolerance to be set when determining appropriate compression ratios, including whether to switch compression ratios. In some embodiments, the threshold may be set to zero.

The result of comparing 310 the spare capacities may be either that the sum of the first spare capacity and the threshold is greater than the second spare capacity or that the sum of the first spare capacity and the threshold is less than the second spare capacity.

If the first space capacity is greater than the second space capacity by the threshold value THRES, then the method may proceed to writing 315 the pending storage block to the first disk with compression ratio C2 and writing 315 the pending storage block to the second disk with compression ratio C1. A data read/write component may be used to write the pending storage block to the appropriate disks with the appropriate compression ratios. The method then proceeds to checking 325 for completion.

Alternatively, if the sum of first space capacity and the threshold value THRES is less than the second space capacity, then the method may proceed to writing 320 the pending storage block to the first disk with compression ratio C1 and writing 320 the pending storage block to the second disk with compression ratio C2. A data read/write component may be used to write the pending storage block to the appropriate disks with the appropriate compression ratios. The method then proceeds to checking 325 for completion.

In some embodiments, the sum of the first spare capacity and the threshold value THRES may be equal to the second spare capacity. In such an embodiment, the method may proceed to either writing 315 the pending storage block to the first disk with compression ratio C2 and writing 315 the pending storage block to the second disk with compression ratio C1 or, alternatively, writing 320 the pending storage block to the first disk with compression ratio C1 and writing 320 the pending storage block to the second disk with compression ratio C2. In some embodiments, defaults may be set to direct which disk to write to with which compression ratio if the two are equal; in some embodiments, manual input may be prompted to direct which disk to write to with which compression ratio if the two are equal. In some embodiments, directing the write may be automated via exchanging the greater-than parameter for a greater-than-or-equal-to parameter (e.g., SPACE_1 430 on DISK_1 425+THRES≥SPACE_2 480 on DISK_2 475) or exchanging the less-than parameter for a less-than-or-equal-to parameter (e.g., SPACE_1 430 on DISK_1 425+THRES≤SPACE_2 480 on DISK_2 475).

The method may continue by checking 325 for completion. The checking 325 may include determining whether there are further storage blocks to write. If there are further storage blocks to write, the method may return to determining 305 the current spare capacity (which is updated for the most recent write) on a first disk and the current spare capacity (also updated for the most recent write) on a second disk. If there are no further storage blocks to write, the method may conclude at the end 330.

The schematic flow diagram 300 is better understood read in conjunction FIG. 4-FIG. 7.

Figure 4:
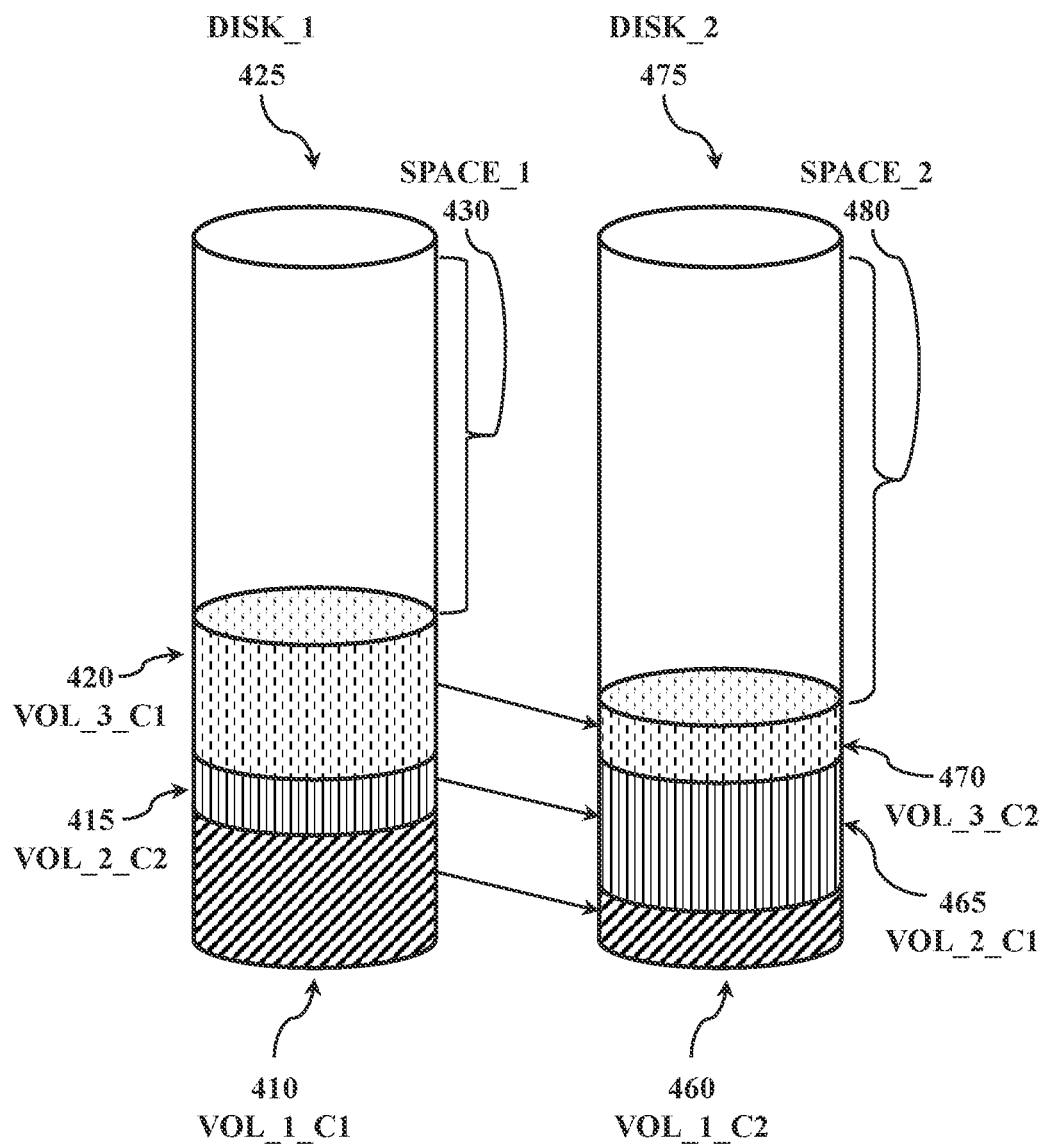
FIG. 4 depicts a schematic diagram of storage disks in accordance with some embodiments of the present disclosure.

FIG. 4 depicts a schematic diagram 400 of mirror storage disks in accordance with some embodiments of the present disclosure. The schematic diagram 400 includes a data mirror written to two drives, DISK_1 225 and DISK_2 275. In FIG. 4, the storage blocks are written on drives contiguously from the bottom of the drives. Different write patterns may be used, storage blocks may be removed, other storage blocks may be added, and the like.

The schematic diagram 400 shows three storage blocks written to the mirrored disks DISK_1 425 and DISK_2 475; the three storage blocks are VOL_1, VOL_2, and VOL_3. Storage blocks VOL_1_C1 410 and VOL_3_C1 420 are written to DISK_1 425 with compression ratio C1, and storage block VOL_2_C2 415 is written to DISK 425 with compression ratio C2. Storage blocks VOL_1_C2 460 and VOL_3_C2 470 are written to DISK_2 475 with compression ratio C2, and storage block VOL_2_C1 465 is written to DISK 425 with compression ratio C1. As illustrated, compression ratio C1 is less than compression ratio C2. This compression results in DISK_1 425 containing compressed volumes VOL_1_C1 410, VOL_2_C2 415, and VOL_3_C1 420. DISK_1 425 has remaining available space, SPACE_1 430. Similarly, as a result of the compression, DISK_2 475 contains compressed volumes VOL_1_C2 460, VOL_2_C1 465, and VOL_3_2 470 and has remaining available space SPACE_2 480.

Figure 5:
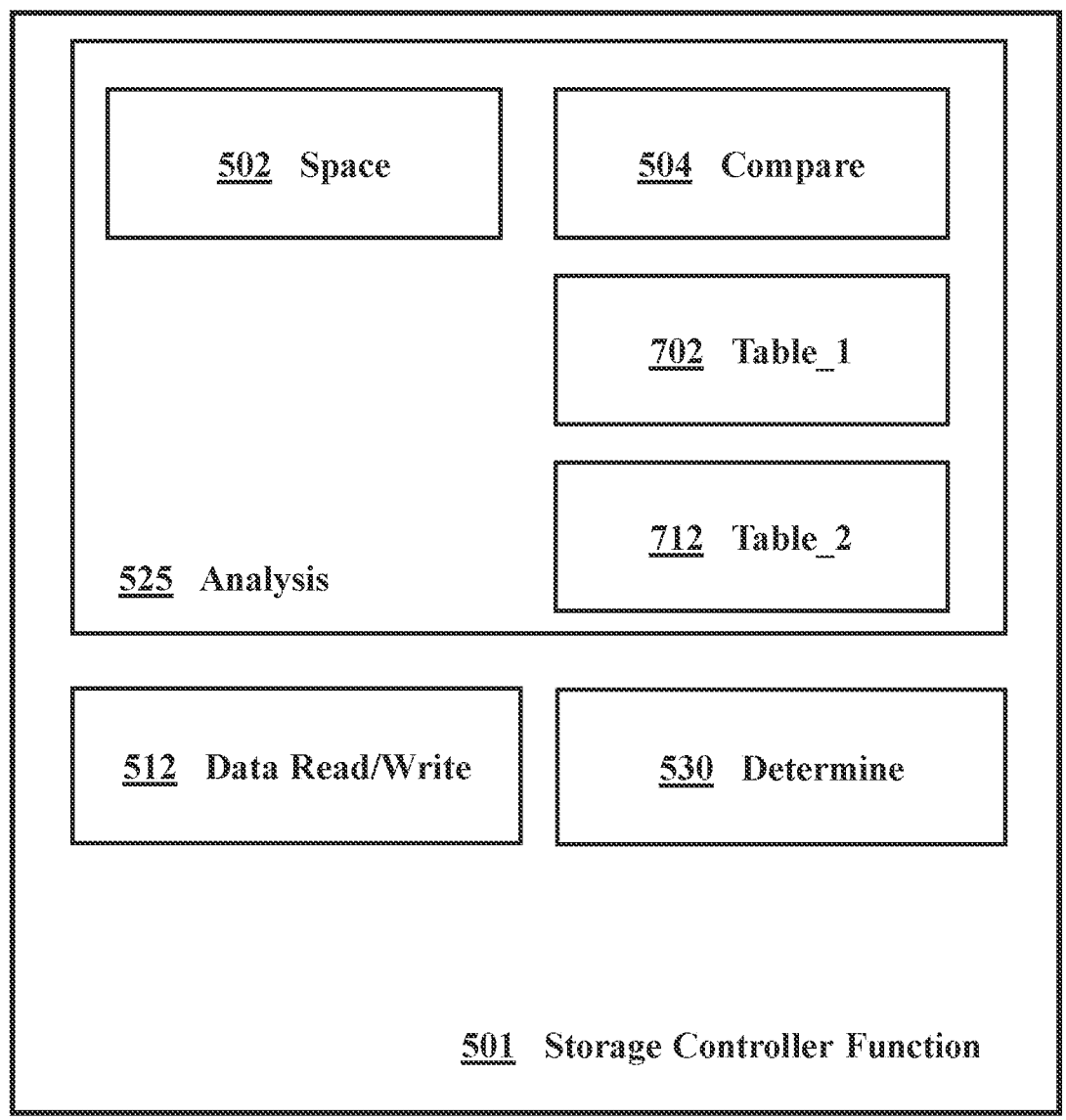
FIG. 5 illustrates a schematic diagram of a storage controller in accordance with some embodiments of the present disclosure.

FIG. 5 illustrates a schematic diagram 500 of a storage controller in accordance with some embodiments of the present disclosure. The schematic diagram 500 includes a storage controller function 501 with a data read/write component 512, a determination component 530, and an analysis component 525. The analysis component 525 includes space component 502, a compare component 504, TABLE_1 702, and TABLE_2 712.

Figure 6:
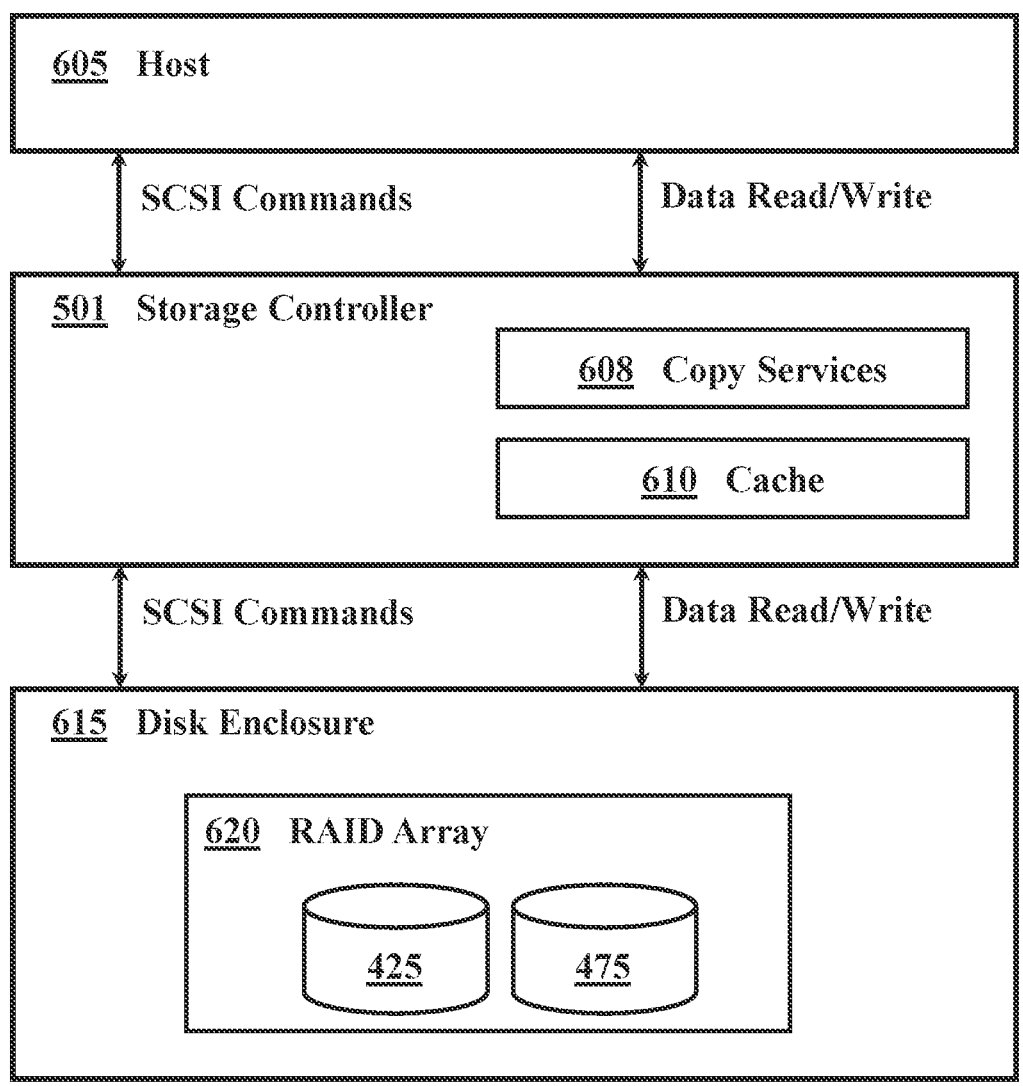
FIG. 6 depicts a schematic diagram of a computer system in accordance with some embodiments of the present disclosure.

FIG. 6 depicts a schematic diagram 600 of a computer system in accordance with some embodiments of the present disclosure. The schematic diagram 600 includes a host 605, a storage controller 501 with RAID controller functionality, a disk enclosure 615, and a RAID array 620. The storage controller 501 includes a stack of components; this stack of components includes a copy services component 608 and a cache component 610. The RAID array 620 includes two storage disks, DISK_1 425 and DISK_2 475. Commands may be passed between the host 605, the storage controller 501, and disk enclosure 615 using SCSI commands. If a cache 610 is available, data may be written to the cache 610 and destaged to the disks according to a cache algorithm. In some embodiments, for reads, data may first be read from the cache 610; if not present (which may be referred to as a cache miss), the data may be read from the disks. Data may be read and written across the depicted interfaces.

In some embodiments of the present disclosure, an analysis component 525 may analyze a set of compression ratios such as C1 and C2 used for a set of storage blocks such as VOL_1, VOL_2, and VOL_3 (not shown) previously written on at least two storage devices (e.g., DISK_1 425 and DISK_2 475) to determine a pattern of writes. In response to the pattern, a determination component 530 may determine compression ratios with which to write a subsequent volume (e.g., VOL_4, not depicted). The set of storage blocks may be an empty set.

In some embodiments of the present disclosure, a method may analyze a set of compression ratios (e.g., C1 and C2) used for a set of storage blocks (e.g., VOL_1, VOL_2, and VOL_3) by analyzing the spare capacities (also known as space, e.g., SPACE_1 430 on DISK_1 425 and SPACE_2 480 on DISK_2 475).

In some embodiments, the method may start at operation start 301 as shown in schematic flow diagram 300 of FIG. 3. The method may continue by analyzing 303 a set of compression ratios used for a set of storage blocks written on the first storage device and the second storage device to determine a pattern. Analyzing 303 a set of compression ratios may include determining 305, via a space component (e.g., space component 502), a spare capacity on a first disk (e.g., SPACE_1 430 on DISK_1 425) and a spare capacity on a second disk (e.g., SPACE_2 480 on DISK_2 475). Analyzing 303 a set of compression ratios may include comparing 310, via a compare component (e.g., compare component 504), a spare capacity on a first disk (e.g., SPACE_1 430 on DISK_1 425) to a spare capacity on a second disk (e.g., SPACE_2 480 on DISK_2 475).

In some embodiments, the compare component (e.g., compare component 504) may determine whether a spare capacity on a first disk (e.g., SPACE_1 430 on DISK_1 425) is greater than a spare capacity on a second disk (e.g., SPACE_2 480 on DISK_2 475) by a threshold value THRES. By using threshold value THRES, the algorithm may allow for a tolerance to be set when determining appropriate compression ratios, including whether to switch compression ratios. Alternatively, the compare component (e.g., compare component 504) may determine that the spare capacity on the first disk (e.g., SPACE_1 430 on DISK_1 425) is not greater than the spare capacity on the second disk (e.g., SPACE_2 480 on DISK_2 475) by a threshold value THRES; the algorithm may allow for a tolerance to be set when determining appropriate compression ratios, including whether to switch compression ratios. In some embodiments, the threshold may be set to zero.

The result of comparing 310 the spare capacities may be either that the sum of the first spare capacity and the threshold is greater than the second spare capacity (e.g., SPACE_1 430 on DISK_1 425+THRES>SPACE_2 480 on DISK_2 475) or that the sum of the first spare capacity and the threshold is less than the second spare capacity (e.g., SPACE_1 430 on DISK_1 425+THRES<SPACE_2 480 on DISK_2 475).

FIG. 4 depicts a schematic diagram 400 of data mirror written to a first disk DISK_1 425 and a second disk DISK_2 475 with approximately equivalent capacities. Three storage blocks VOL_1, VOL_2, and VOL_3 were written to the mirrored disks DISK_1 425 and DISK_2 475. Storage blocks VOL_1 and VOL_3 were written to DISK_1 425 with compression ratio C1; storage block VOL_2 was written to DISK_1 425 with compression ratio C2. Storage blocks VOL_1 and VOL_3 were written to DISK_2 475 with compression ratio C2; storage block VOL_2 was written to DISK_2 475 with compression ratio C1. The result of these writes is that DISK_1 425 contains compressed volumes VOL_1_C1 410, VOL_2_C2 415, VOL_3_C1 420 and that DISK_2 475 contains compressed volumes VOL_1_C2 460, VOL_2_C1 465, VOL_3_C2 470. Given DISK_1 425 and DISK_2 475 have approximately equivalent capacities, and given more of the data on DISK_2 475 is more compressed than the data on DISK_1 425, less space was necessary for storing the storage blocks to DISK_2 475 than was necessary for storing the same (but less compressed) storage blocks to DISK_1 425. Thus, SPACE_1 430 is less than SPACE_2 480. Less space is used on DISK_2 475 (resulting in more available space) than on the DISK_1 425 partner disk. Therefore, the system may determine that DISK_2 475 is a good candidate for the next low compression write.

The result of comparing 310 the spare capacities may be either that the sum of the first spare capacity and the threshold is greater than the second spare capacity (e.g., SPACE_1 430 on DISK_1 425+THRES>SPACE_2 480 on DISK_2 475) or that the sum of the first spare capacity and the threshold is less than the second spare capacity (e.g., SPACE_1 430 on DISK_1 425+THRES<SPACE_2 480 on DISK_2 475).

Again considering FIG. 3, if the first space capacity (e.g., SPACE_1 430) is greater than the second space capacity (e.g., SPACE_2 480) by the threshold value THRES, then the method may proceed to writing 315 the pending storage block (e.g., VOL_4) to the first disk (e.g., DISK_1 425) with compression ratio C2 and writing 315 the pending storage block (e.g., VOL_4) to the second disk (e.g., DISK_2 475) with compression ratio C1. A data read/write component (e.g., data read/write component 512) may be used to write the pending storage block to the appropriate disks with the appropriate compression ratios. The method then proceeds to checking 325 for completion.

Alternatively, if the sum of the first space capacity (e.g., SPACE_1 430) and the threshold value THRES is less than the second space capacity (e.g., SPACE_2 480), then the method may proceed to writing 320 the pending storage block (e.g., VOL_4) to the first disk (e.g., DISK_1 425) with compression ratio C1 and writing 320 the pending storage block (e.g., VOL_4) to the second disk (e.g., DISK_2 475) with compression ratio C2. A data read/write component (e.g., data read/write component 512) may be used to write the pending storage block to the appropriate disks with the appropriate compression ratios. The method then proceeds to checking 325 for completion.

In some embodiments, the sum of the first spare capacity (e.g., SPACE_1 430) and the threshold value THRES may be equal to the second spare capacity (e.g., SPACE_2 480). In such an embodiment, the method may proceed to either writing 315 the pending storage block to the first disk with compression ratio C2 and writing 315 the pending storage block to the second disk with compression ratio C1 or, alternatively, writing 320 the pending storage block to the first disk with compression ratio C1 and writing 320 the pending storage block to the second disk with compression ratio C2. In some embodiments, defaults may be set to direct which disk to write to with which compression ratio if the two are equal; in some embodiments, manual input may be prompted to direct which disk to write to with which compression ratio if the two are equal. In some embodiments, directing the write may be automated via inputting a greater-than-or-equal-to parameter (e.g., SPACE_1 430 on DISK_1 425+THRES≥SPACE_2 480 on DISK_2 475) or a less-than-or-equal-to parameter (e.g., SPACE_1 430 on DISK_1 425+THRES≤SPACE_2 480 on DISK_2 475).

The method may continue by checking 325 for completion. The checking 325 may include determining whether there are further storage blocks to write. If there are further storage blocks to write, the method may return to determining 305 the current (as in, updated for the most recent write) spare capacity on a first disk and the current spare capacity on a second disk. If there are no further storage blocks to write, the method may conclude at the end 330.

In some embodiments of the present disclosure, it may be advantageous to measure overall space capacity on a disk and/or the spare capacity on a disk. Appropriate compression ratios for subsequent writes may be determined by measuring the overall space capacity and/or the spare capacity. By measuring space and/or spare capacities of a disk, the actual compression ratios achieved for storage blocks already written to the disks may be considered.

FIG. 7 illustrates a diagram 700 of tables which may be used to determine a pattern of compression ratios in accordance with some embodiments of the present disclosure.

The method may continue by analyzing 303 a set of compression ratios used for a set of storage blocks written on the first storage device and the second storage device to determine a pattern. Analyzing 303 a set of compression ratios may include determining 305, via a space component, a spare capacity on a first disk (e.g., SPACE_1 130 on DISK_1 125) and a spare capacity on a second disk (e.g., SPACE_2 180 on DISK_2 175). Analyzing 303 a set of compression ratios may include comparing 310, via a compare component, the spare capacity on a first disk to the spare capacity on a second disk.

In some embodiments, the method includes analyzing 303 the set of compression ratios C1 and C2 used for the set of storage blocks VOL_X (X=1 to N) previously written. This may be accomplished by analyzing 303 the storage block most recently written (e.g., VOL_N) on DISK_1 425 as well as the storage block most recently written (e.g., VOL_N) on DISK_2 475. A pattern may be stored in a compression table such as TABLE_1 702 for DISK_1 425. The pattern is depicted in FIG. 7 as {C1, . . . C2, C1, C2, C1}. The compression ratio most recently used is for the write of VOL_N on DISK_1 425 and is determined by reviewing the entry 705 for $T_N$; this reveals the most recently used compression ratio to be C1.

A pattern may also be stored in a compression table (not shown) for DISK_2 475. The compression ratio most recently used for the write of VOL_N on DISK_2 475 may similarly be determined to be C2. The method may determine that, for the write of VOL_N+1 to DISK_1 425, the compression ratio most recently used for the write of VOL_N on DISK_2 475 (in this example, C2) is to be used. The method may also determine that, for the write of VOL_N+1 to DISK_2 475, the compression ratio most recently used for the write of VOL_N on DISK_1 425 (in this example, C1) is to be used. The method may rotate between which disk is using which compression technique so that the total storage used on the disks remains balanced. In some embodiments, the method may rotate compression ratios after each write; in the example provided, VOL_N+1 (not depicted) would thus be written with compression ratio C2 on DISK_1 425 and VOL_N+1 would be written with compression ratio C1 on DISK_2 475.

In some embodiments, the method may rotate which disk is using which compression technique so that the total storage used on the disks remains balanced; in some embodiments, the method may rotate compression techniques at the analyzing 303 operation. For example, after a set number of writes, Y=4 may have been mirrored or copied to each disk. The method may analyze the set of compression ratios (e.g., C1 and C2) that are used for the set of storage blocks VOL_X (X=1 to N) previously written. A pattern may be discovered by analyzing the most recently written storage blocks VOL_N through VOL_1 on DISK_1 425 and VOL_N through VOL_1 written on DISK_2 475. The pattern may be stored in a compression table such as TABLE_2 712 for DISK_1 425. The pattern is depicted in FIG. 7 as {C1, . . . C2, C2, C2, C2}. The count of times that a compression ratio has been sequentially used may also be stored in column C 720.

The table TABLE_2 712 shows that the most recent volumes VOL_N through VOL_N–3 used a compression ratio of C2 for writes to DISK_1 425 and that this compression ratio has been used four times in a row. A corresponding table (not shown) for DISK_2 475 would show the most recent volumes VOL_N through VOL_N–3 used a compression ratio of C1 for writes to DISK_2 475. As, in this example, Y is set at 4, when VOL_N+1 is mirror written to DISK_1 425 and DISK_2 475, a compression ratio of C1 will be used for DISK_1 425 and a compression ratio of C2 will be used for DISK_2 475.

It is to be understood that Y may be any integer number and that one or more other patterns may be established as triggering a compression ratio change for the next write. Such patterns may be dependent on, for example, the relative size of the compression ratios (e.g., C1 and C2). It is also to be understood that a number of compression ratios C1 through CN may be used in accordance with the present disclosure.

By using such an algorithm, the benefit of higher compression to save space may be used while the impact of the slower performance may be hidden (e.g., reduced or eliminated). Writes may complete when the faster, low compressed writes have completed; a read would not be impacted by needing to do a slower decompression as the reads may be directed to the mirror with the least compressed version of the data.

In some embodiments of the present disclosure, a RAID array (e.g., RAID array 620 of FIG. 2) may be configured for RAID 51. This represents a stack of RAIDs equivalent to a logical RAID 1 overlying a RAID 5 array.

The disclosure may also be applied with the two disks DISK_1 425 and DISK_2 475 discussed above replaced by two logical disks LDISK_1 (not shown) and LDISK_2 (not shown). Each of these two disks may be made up of two RAID 5 arrays. To analyze spare space, the spare space on the disks making up the RAID 5 arrays may be taken into consideration; similarly, the compression ratios used on these disks may be considered.

Some embodiments of the present disclosure may apply to various other copy function technologies. For example, embodiments of the present disclosure may be used to generate one or more snapshot and/or clone copies, asynchronous remote copies, and synchronous remote copies for point-in-time copy functions.

In some embodiments, the present disclosure may be used for remote mirror and copy storage features. Some remote mirror and copy storage features may regularly update a target copy of a volume so that it matches changes that were made to its associated source volume. The remote mirror and copy may not capture the state of the source volume at some point in time; rather, it may reflect all changes that were made on the source volume to the target volume.

In some embodiments, an asynchronous long-distance copy option may be used to write operations to a storage unit at a production site. The copies may be considered complete before they are transmitted to a storage unit at a recovery site. Other functions may provide a synchronous long-distance copy option that regularly updates a secondary copy of a volume to match changes made to a source volume. Writes to the production site may only be considered complete when transmitted to a storage unit at a recovery site.

Point-in-time copy is a feature supported on various storage devices that may allow nearly instantaneous copies of entire logical volumes or data sets to be made. The point-in-time function allows full volume copies of data to be made such that the copies may be immediately available for read or write access. The copy may be used with standard backup tools that are available in a computing environment to create backup copies on tape.

A snapshot feature may provide the ability to record the state of a storage device at any given moment and preserve that snapshot as a guide for restoring the storage device in the event that it fails. A snapshot primarily generates a point-in-time copy of the data. Typically, a snapshot copy function is done instantly and made available for use by other applications such as data protection, data analysis, data reporting, and data replication applications. The original copy of the data continues to be available to the applications without interruption while the snapshot copy is used to perform other functions on the data.

A snapshot is a point-in-time copy that may be dependent on a primary disk. A snapshot may, for example, be accomplished using a copy-on-write procedure in which currently existing data in a region on the primary disk may be written to the backup disk when a write is made to the region on the primary disk. Thus, the backup disk will contain data that has been overwritten on the primary disk (as opposed to a complete copy of the primary disk). This type of backup copy typically results in a thinly provisioned volume which reduces storage.

A series of snapshot copies may be cascaded together to represent a primary disk at various times; however, the cascaded snapshot copies typically remain dependent on the primary disk to reassemble a complete copy of the primary disk. Thus, a snapshot may be a point-in-time copy where the target may only hold the changed data necessary to present the point-in-time copy of the source. Data is only copied to the target disk if it is changed on the source. The target disk may be dependent on some of the data on the source disk to present the point-in-time copy.

In contrast, a clone is a point-in-time copy independent of the primary disk. A clone may, for example, be generated by executing a background copy procedure in which the regions of a disk are sequentially copied to the backup disk as well as executing a copy-on-write procedure to immediately copy any primary disk regions that are about to be overwritten due to a write that have not yet been processed by the background copy procedure. A clone may be used when a copy is needed and input/output (I/O) to the copy must not impact I/O to the primary volume. A clone may also be used when the copy is not to be affected by availability to the source. A clone may also be used in a cascade. Thus, a clone is a point-in-time copy such that the target disk holds a complete copy of the data that was on the source disk when the point-in-time copy was started. When the copying of the data from a source to a target completes, the target disk may be independent of the source.

Point-in-time copies may be made using a bitmap to keep track of data grains copied over from a source disk to a target disk. When data is copied between a source and a target, the data is copied in chunks known as grains. Grain size may be determined at the time of map generation. Some sizes may be 256 KB and 64 KB. Data grains may be copied using a background copy process. In the event of a read of a data grain to the target drive before the data grain has been copied over the target, the read may be redirected to the source drive. In the event of a read of a data grain to the target drive after the data grain has been copied over to the target, the read is directed to the target drive. In the event of a write of a data grain to the target drive before the data grain has been copied over to the target, the corresponding entry in the bitmap may be marked as complete. In the event of a write of a data grain to the target drive after the data grain has been copied over the target, the write may be directed to the target drive. In the event of a write of a data grain to the source drive before the data grain has been copied over the target, the data grain may first be copied to the target drive before the source disk data grain is overwritten with new data. In this way the source and target drives may be presented to the host as being instantaneously available even before all data has been copied over to the target drive.

In a RAID 1 write, a storage block may be written to two disks at the same time. In contrast, in a remote copy, an existing storage block may be copied from a source to a target, equivalent to performing a read from the source, and a write to the target.

In some embodiments of the present disclosure, DISK_2 475 may be a target volume for a copy operation from DISK_1 425. The method may include analyzing a set of compression ratios used on the copy source volume, and on the copy target volume, to determine a pattern. The pattern may be analyzed to determine a first compression ratio to be used with subsequent writes to the source disk; the pattern may also be analyzed to determine a second compression ratio to be used for subsequent writes to the target drive. Writes to the target as part of the copying process may consider the compression ratio of the source grain to determine the compression ratio of the target write.

In some embodiments, the target may be a point in time copy of a source. When a grain of the source is overwritten, a copy of the grain may first be made to the target of the existing data on the source drive. Analyzing compression ratios, the write of the existing data to the target disk can be made using one compression ratio, and the write of the new data to the source can use another, different, ratio.

Figure 8:
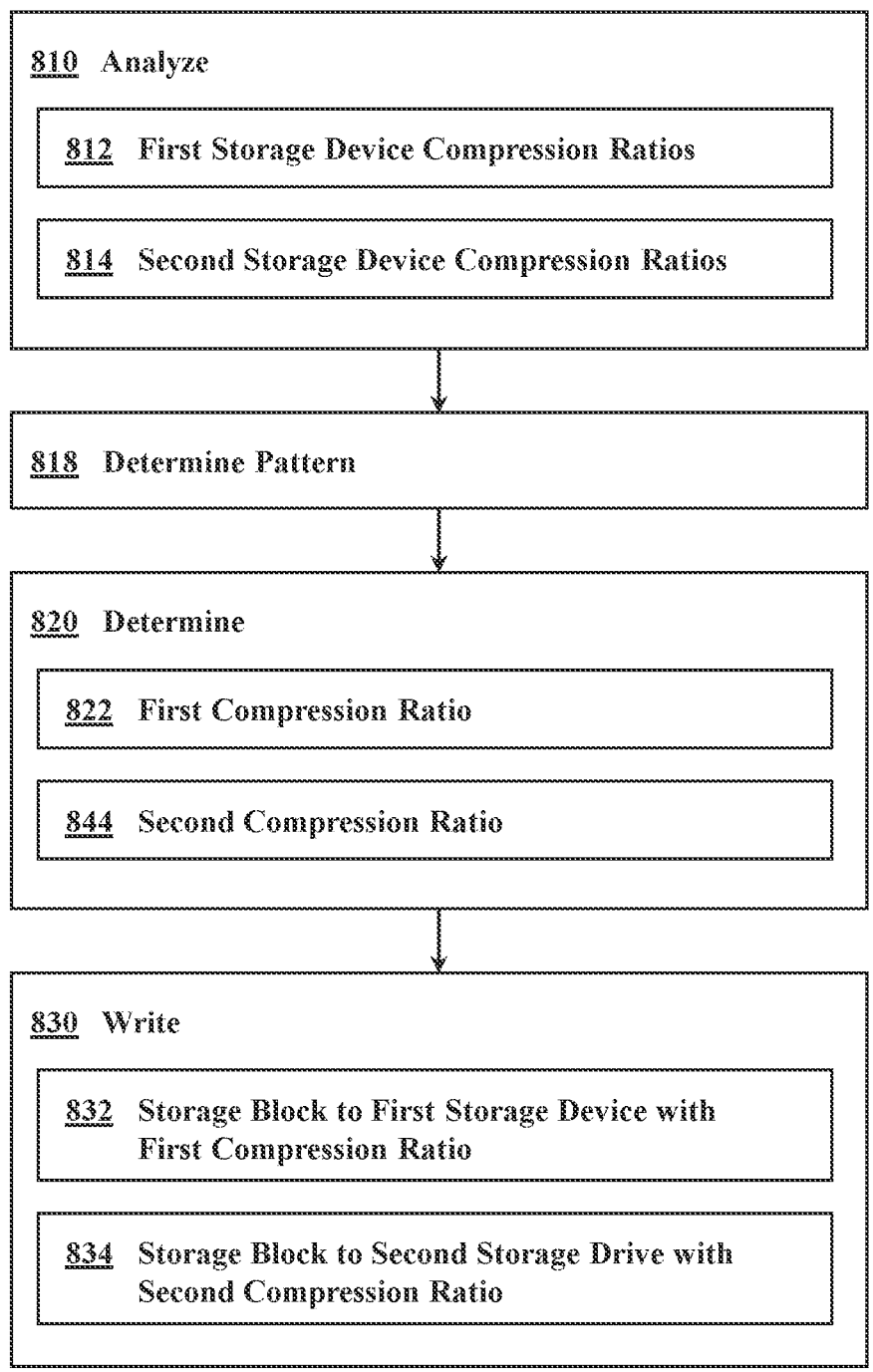
FIG. 8 depicts a flowchart of a method in accordance with some embodiments of the present disclosure.

FIG. 8 depicts a flowchart of a method 800 for managing a storage system in accordance with some embodiments of the present disclosure. The method 800 includes analyzing 800 the compression ratios for storage blocks written on a first storage device 812 and analyzing 800 the compression ratios for storage blocks written on a second storage device 814 to determine a pattern 818.

The method 800 includes, in response to determining a pattern, determining 820 a first compression ratio 822 and a second compression ratio 824. The first compression ratio 822 may be different from the second compression ratio 824.

The method 800 includes writing 830 a storage block to the first storage device with the first compression ratio 832 and writing 830 the storage block to the second storage device with the second compression ratio 834.

The descriptions of the various embodiments of the present disclosure are presented for purposes of illustration; these embodiments are not intended to be exhaustive and the disclosure is not limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, and/or to enable others of ordinary skill in the art to understand the embodiments disclosed herein. The components of the application, as generally described and illustrated in the figures herein, may be arranged and designed in a wide variety of different configurations. The detailed description of the embodiments is thus not intended to limit the scope of the disclosure; instead, it is merely representative of selected embodiments thereof.

The disclosure may be practiced with operations in a different order and/or with hardware elements in configurations that are different than those which are disclosed. Therefore, although the application has been described based upon these embodiments, certain modifications, variations, and alternative constructions will be apparent to those of ordinary skill in the art.

While some embodiments of the present application have been described, it is to be understood that the embodiments described are illustrative only and the scope of the application is to be defined solely by the appended claims in consideration with a full range of equivalents and modifications (e.g., protocols, hardware devices, software platforms etc.) thereto.

Moreover, the same or similar reference numbers are used throughout the drawings to denote the same or similar features, elements, or structures; thus, a detailed explanation of the same or similar features, elements, or structures may not be repeated for each of the figures. The terms "about" or "substantially" as used herein with regard to thicknesses, widths, percentages, ranges, et cetera are meant to denote being close or approximate to but not necessarily exactly. For example, the term "about" or "substantially" as used herein may imply that a small margin of error may be present. Further, the terms "vertical," "vertical direction," and "vertical height" as used herein denote a Z-direction of the Cartesian coordinates which may be shown in the figures; similarly, the terms "horizontal," "horizontal direction," and "lateral direction" as used herein denote an X-direction and/or Y-direction of the Cartesian coordinates shown in the figures.

Additionally, the term "illustrative" is used herein to mean "serving as an example, instance or illustration." Any embodiment or design described herein is intended to be illustrative. Illustrative embodiments are not necessarily preferred or advantageous over other embodiments or designs.

It is to be understood that although this disclosure includes a detailed description on cloud computing, implementation of the teachings recited herein are not limited to a cloud computing environment. Various embodiments of the present disclosure may be implemented in conjunction with any other type of computing environment now known or later developed.

For the avoidance of doubt, the terms "comprising" and/or "including," as used herein throughout the description and claims, is not to be construed as meaning "consisting only of." Rather, the terms "comprising" and/or "including" may indicate that one or more additional elements may be used in accordance with the present disclosure.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system for managing a storage array in a storage system, wherein said storage array comprises a first data block and a second data block, said system comprising:
    an analysis component for analyzing a set of compression ratios used for a set of storage blocks written on said first storage device and said second storage device to determine a pattern;
    a determination component for determining that a first spare capacity is greater than a second spare capacity by a threshold value and for determining, responsive to said pattern, a first compression ratio and a second compression ratio, wherein said first compression ratio is different from said second compression ratio; and
    a data read/write component for writing a storage block to said first storage device with said first compression ratio and writing said storage block to said second storage device with said second compression ratio.

2. The system of claim 1, wherein:
    said analysis component further comprises a space component for determining said first spare capacity on said first storage device and said second spare capacity on said second storage device.

3. The system of claim 1, wherein:
    said analysis component is further operable for determining that a third compression ratio has been used for said most recent Y writes to said first storage device and a fourth compression ratio has been used for said most recent Y writes to said second storage device; and
    said determination component is further operable for determining that said first compression ratio equals said fourth compression ratio and determining said second compression ratio comprises said third compression ratio.

4. The system of claim 1, wherein said first storage device and said second storage device are members of a RAID array.

5. The system of claim 4, wherein said RAID array is selected from the group consisting of RAID 1, RAID 10, RAID 51, and RAID 61.

6. The system of claim 1, wherein said second storage device is a copy of said first storage device.

7. The system of claim 6, wherein said second storage device is a point-in-time copy of said first storage device.

8. A computer implemented method for managing a storage system, said storage system comprising a first storage device and a second storage device, said method comprising:
    determining that a first spare capacity is greater than a second spare capacity by a threshold value;
    analyzing a set of compression ratios used for a set of storage blocks written on said first storage device and said second storage device to determine a pattern;
    determining a first compression ratio and a second compression ratio in response to said pattern, wherein said first compression ratio is different from said second compression ratio;
    writing a storage block to said first storage device with said first compression ratio; and
    writing said storage block to said second storage device with said second compression ratio.

9. The method of claim 8, further comprising:
    analyzing said set of compression ratios comprises determining said first spare capacity on said first storage device and said second spare capacity on said second storage device.

10. The method of claim 8, further comprising:
    analyzing said set of compression ratios comprises determining that a third compression ratio has been used for said most recent Y writes to said first storage device and a fourth compression ratio has been used for said most recent Y writes to said second storage device; and
    determining said first compression ratio comprises determining that said first compression ratio equals said fourth compression ratio; and
    determining said second compression ratio comprises determining said second compression ratio comprises said third compression ratio.

11. The method of claim 8, wherein said first storage device and said second storage device are members of a RAID array.

12. The method of claim 11, wherein said RAID array is selected from the group consisting of RAID 1, RAID 10, RAID 51, and RAID 61.

13. The method of claim 11, wherein said second storage device is a copy of said first storage device.

14. The method of claim 13, wherein said second storage device is a point-in-time copy of said first storage device.

15. A computer program product for managing a storage array in a storage system, said computer program product comprising: a computer readable storage medium readable by a processing circuit and storing instructions for execution by said processing circuit for performing a method, said method comprising:
   determining that a first spare capacity is greater than a second spare capacity by a threshold value;
   analyzing a set of compression ratios used for a set of storage blocks written on said first storage device and said second storage device to determine a pattern;
   in response to said pattern, determining a first compression ratio and a second compression ratio, said first compression ratio being different from said second compression ratio; and
   writing a storage block to said first storage device with said first compression ratio and writing said storage block to said second storage device with said second compression ratio.

16. The computer program product of claim 15, further comprising:
   analyzing said set of compression ratios comprises determining said first spare capacity on said first storage device and said second spare capacity on said second storage device.

17. The computer program product of claim 15, further comprising:
   analyzing said set of compression ratios comprises determining that a third compression ratio has been used for said most recent Y writes to said first storage device and a fourth compression ratio has been used for said most recent Y writes to said second storage device; and
   determining said first compression ratio comprises determining that said first compression ratio equals said fourth compression ratio; and
   determining said second compression ratio comprises determining said second compression ratio comprises said third compression ratio.

18. The computer program product of claim 15, wherein said first storage device and said second storage device are members of a RAID array.

19. The computer program product of claim 18, wherein said RAID array is selected from the group consisting of RAID 1, RAID 10, RAID 51, and RAID 61.

20. The computer program product of claim 18, wherein said second storage device is a copy of said first storage device.

* * * * *